(12) United States Patent
Iida et al.

(10) Patent No.: US 6,214,104 B1
(45) Date of Patent: Apr. 10, 2001

(54) COATING SOLUTION FOR FORMING SILICA COATING AND METHOD OF FORMING SILICA COATING

(75) Inventors: Hiroyuki Iida; Hiroki Endo; Hideya Kobari, all of Kanagawa; Yoshio Hagiwara, Tokyo; Toshimasa Nakayama, Kanagawa, all of (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 08/692,005

(22) Filed: Aug. 2, 1996

(30) Foreign Application Priority Data

Aug. 7, 1995 (JP) .................................................. 7-200838

(51) Int. Cl.$^7$ ............................ B05D 7/12; C09D 183/02
(52) U.S. Cl. ................................ 106/287.13; 106/287.14; 106/287.16; 427/96; 427/226; 427/240
(58) Field of Search ......................... 106/287.13, 287.14, 106/287.16; 427/96, 226, 240

(56) References Cited

U.S. PATENT DOCUMENTS

| 4,748,053 | 5/1988 | Okada | 427/240 |
| 4,798,629 | * 1/1989 | Wood et al. | 106/287.16 |
| 4,865,649 | * 9/1989 | Kashiwagi et al. | 106/287.16 |
| 5,496,402 | * 3/1996 | Sakamoto et al. | 106/287.16 |

FOREIGN PATENT DOCUMENTS

| 63313160 | 12/1963 | (JP) . |
| 62-190838 | 8/1987 | (JP) . |
| 2156626 | 6/1990 | (JP) . |

* cited by examiner

Primary Examiner—David Brunsman
(74) Attorney, Agent, or Firm—Weiner, Carrier, Burt & Esser, P.C.; Joseph P. Carrier; Irving M. Weiner

(57) ABSTRACT

A substrate onto which a coating solution is dropped is rotated at a low speed in a first rotational mode and then after an interval of time at a high speed in a second rotational mode. At the end of the first rotational mode, the coating solution is coated to a thickness larger than a given thickness on irregularities on the substrate such as twin patterns and a global pattern, with the coating solution being coated to a thickness smaller than the given thickness between the twin patterns. Subsequently, at the start of the second rotational mode, the coating solution coated on the twin patterns and the global pattern flows into spaces between these patterns. At the end of the second rotational mode, the thickness of the coating solution on the twin patterns is almost nil, and the thickness of the coating solution on the global pattern is small in its entirety though it is somewhat large in the central area of the global pattern.

20 Claims, 2 Drawing Sheets

COATING SOLUTION FOR FORMING SILICA COATING AND METHOD OF FORMING SILICA COATING

BACKGROUND OF THE INVENTION

1. Field of the Invention

The present invention relates to a coating solution for forming a silica coating and a method of forming such a silica coating, and more particularly to a coating solution for forming a silica coating which is free from cracks even if it has a large thickness, is highly homogeneous and dense, and provides a highly flat surface even on a substrate having surface irregularities or steps, and a method of forming such a silica coating.

2. Description of the Related Art

Recent rapid development of the VLSI fabrication technology imposes stricter requirements for more stacked layers, higher operation speeds, and more functions in the multilayer interconnection technology. Specifically, the fabrication of semiconductor devices requires interconnection patterns and insulating films to be formed on substrates. Such interconnection patterns and insulating films on substrates necessarily produce surface steps or irregularities. If an interconnection pattern is to be formed directly on such surface steps or irregularities, then the interconnection pattern cannot be defined accurately to fine details due to those surface steps or irregularities. For this reason, it has been customary to flatten the substrate surface to remove any undesired steps or irregularities therefrom.

Heretofore, the spin-on-glass (SOG) coating process is generally employed to make substrate surfaces even to remove surface steps or irregularities therefrom. According to the SOG coating process, a coating solution is prepared which comprises tetraalkoxysilane dissolved in an organic solvent mainly of alcohol, and applied to a substrate surface having steps. After the coating solution is coated to fill recesses in the substrate surface and cover the entire substrate surface, the assembly is heated to produce a silica coating, thereby flattening the substrate surface.

Since the above SOG coating process employs tetraalkoxysilane, the produced silica coating is a completely inorganic coating and has highly reliable properties. However, the coating solution has such a low viscosity that it will produce a silica coating having a thickness up to a maximum of 0.4 $\mu$m in one coating cycle. Such a thickness is not large enough to eliminate surface irregularities on the substrate in one coating process. To achieve a desired coating thickness, the coating process has to be repeated a number of times. However, the coating produced by repeating the coating process is susceptible to cracks and hence is not acceptable for practical use.

The above shortcomings may be eliminated by a coating solution for forming a silicon coating of alkoxysilane with an alkyl group partly introduced therein, as disclosed in Japanese laid-open patent publication No. 63-221076. The disclosed coating solution comprises a combination of tetraalkoxysilane and monoalkyltrialkoxysilane or dialkylalkoxysilane. Since an organic group remains after hydrolysis, the coating solution has an excessive viscosity, allowing a coating having a thickness of 1 $\mu$m or greater to be formed when it is applied in one coating cycle. However, the coating produced by the disclosed coating solution is less flat than the coating produced by the coating solution of tetraalkoxysilane, and tends to produce wrinkle-like irregularities on the surface of the coating.

Various improved coating apparatus have been proposed in recent years to increase the flatness of silica coating surfaces. For example, rotary cup coating apparatus has been developed for use in place of rotary coating apparatus known as a spinner. The rotary cup coating apparatus are effective to produce flatter coatings on substrates than the conventional spinners. Nevertheless, the existing rotary cup coating apparatus are not effective enough to produce coatings that are completely free from wrinkle-like irregularities on their surfaces.

Based on a material-oriented approach, there have been demands in the art for a coating solution for forming a silica coating with better surface flatness, particularly a coating solution which can produce a silica coating with a highly flat surface, in combination with rotary cup coating apparatus.

SUMMARY OF THE INVENTION

It is therefore an object of the present invention to provide a coating solution for forming a silica coating with excellent surface flatness particularly in combination with a rotary cup coating apparatus.

According to the present invention, there is provided a coating solution for forming a silica coating, cormprising a reaction product produced by hydrolyzing, in the presence of an acid catalyst, a mixture of at least two alkoxysilane compounds that are represented by the following general formulas:

$$R^1{}_2Si(OR^3)_2 \quad\quad (I),$$

$$R^2Si(OR^4)_3 \quad\quad (II),$$

and $$Si(OR^5)_4 \quad\quad (III)$$

where $R^1$, $R^2$ each indicate an alkyl or phenyl group having a carbon number of 1 to 3, and $R^3$, $R^4$, $R^5$ each indicate an alkyl group having a carbon number of 1 to 3;

an organic solvent; and a quaternary ammonium-salt compound.

According to the present invention, there is also provided a method of forming a coating of the coating solution described above on a planar workpiece with a rotary cup coating apparatus, comprising the steps of:

dropping the coating solution onto the planar workpiece;

rotating the planar workpiece at a first speed in a first rotational mode for a first period of time less than 2 seconds;

stopping the planar workpiece for a period of time which is 10 to 20 times the first period of time after the first rotational mode; and thereafter, rotating the planar workpiece at a second speed higher than the first speed in a second rotational mode for a second period of time which is 3 to 5 times the first period of time.

According to the present invention, there is further provided a method of forming a coating of the coating solution described above on a planar workpiece with a rotary cup coating apparatus, comprising the steps of:

dropping the coating solution onto the planar workpiece;

rotating the planar workpiece at a first speed in a first rotational mode for a first period of time less than 2 seconds;

stopping the planar workpiece for a period of time which is 10 to 20 times the first period of time after the first rotational mode; and thereafter, rotating the planar workpiece successively at a second speed higher than the first speed and at a third speed higher than the second speed in a second rotational mode for a second period of time which is 3 to 5 times the first period of time.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
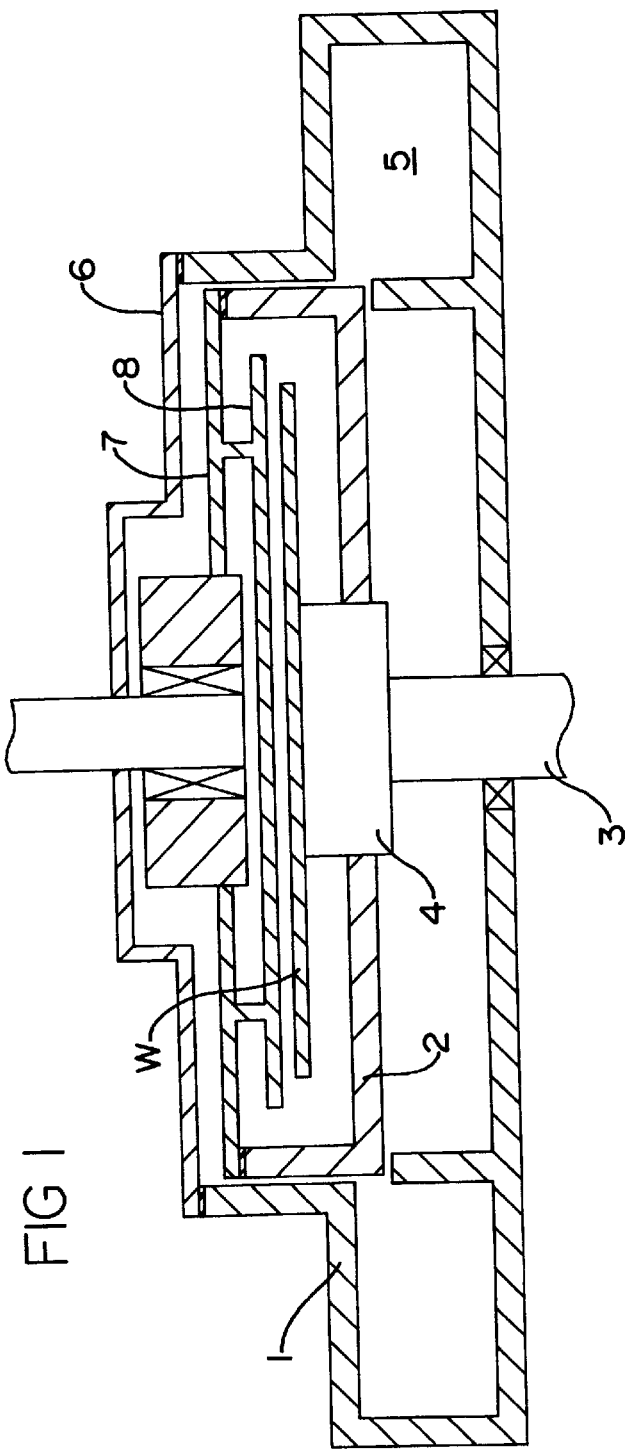
FIG. 1 is a cross-sectional view of a rotary cup coating apparatus which is used to apply a coating solution for forming a silica coating according to the present invention.

A coating solution for forming a silica coating according to the present invention comprises, as an indispensable component, a reaction product produced by hydrolyzing, in the presence of an acid catalyst, a mixture of at least two alkoxysilane compounds that are represented by the following general formulas:

$$R^1{}_2Si(OR^3)_2 \quad (I),$$

$$R^2Si(OR^4)_3 \quad (II),$$

and $$Si(OR^5)_4 \quad (III)$$

where $R^1$, $R^2$ each indicate an alkyl or phenyl group having a carbon number of 1 to 3, and $R^3$, $R^4$, $R^5$ each indicate an alkyl group having a carbon number of 1 to 3.

The alkoxysilane compounds include monomethyltrimethoxysilane, monomethyltriethoxysilane, monomethyltripropoxysilane, monoethyltrimethoxysilane, monoethyltriethoxysilane, monoethyltripropoxysilane, monopropyltrimethoxysilane, monopropyltriethoxysilane, monopropyltripropoxysilane, monophenyltrimethoxysilane, monophenyltriethoxysilane, monophenyltripropoxysilane, dimethyldimethoxysilane, dimethyldiethoxysilane, dimethyldipropoxysilane, diethyldimethoxysilane, diethyldiethoxysilane, diethyldipropoxysilane, dipropyldimethoxysilane, dipropyldiethoxysilane, dipropyldipropoxysilane, diphenyldimethoxysilane, diphenyldiethoxysilane, diphenyldipropoxysilane, tetramethoxysilane, tetraethoxysilane, tetrapropoxysilane, etc.

At least two of the above alkoxysilane compounds may be used in any combination. Practically preferable are generally combinations of the alkoxysilane compounds represented by the above general formulas (I), (II), and (III). If three alkoxysilane compounds represented by the general i formulas (I), (II), and (III) are mixed together, then the alkoxysilane compound represented by the general formula (I) should be of a proportion in the range from 0.5 to 2 moles, the alkoxysilane compound represented by the general formula (II) should be of a proportion of 1 mole, and the alkoxysilane compound represented by the general formula (III) should be of a proportion in the range from 0.5 to 5 moles. If two out of three alkoxysilane compounds represented by the general formulas (I), (II), and (III) are mixed together, then the alkoxysilane compound represented by the general formula (I) or (II) should be of a proportion in the range from 0.2 to 2 moles, and the alkoxysilane compound represented by the general formula (III) should be of a proportion of 1 mole. Particularly preferable for producing a silica coating of high surface flatness is a combination of 1 mole of monomethyltrimethoxysilane, 0.1 to 1.8 moles of dimethyldimethoxysilane, and 0.5 to 3 moles of tetramethoxysilane.

The selected alkoxysilane compounds are dissolved in an organic solvent of monohydric alcohol such as methyl alcohol, ethyl alcohol, propyl alcohol, or butyl alcohol, or polyhydric alcohol such as ethylene glycol, diethylene glycol, triethylene glycol, tetraethylene glycol, propylene glycol, dipropylene glycol, or hexylene glycol, or ethylene glycol monomethyl ether, ethylene glycol monoethyl ether, ethylene glycol monopropyl ether, ethylene glycol monobutyl ether, ethylene glycol monoisobutyl ether, ethylene glycol monohexyl ether, ethylene glycol monophenyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monobutyl ether, diethylene glycol monoisobutyl ether, diethylene glycol monohexyl ether, triethylene glycol monomethyl ether, triethylene glycol monobutyl ether, dipropylene glycol monomethyl ether, dipropylene glycol monopropyl ether, dipropylene glycol monobutyl ether, or the like. One of the above organic solvents may be used alone, or at least one of the above organic solvents may be used in combination. Preferable organic solvents are propylene glycol monomethyl ether, propylene glycol monopropyl ether, propylene glycol and hexylene glycol. Particularly, a mixed solvent of propylene glycol monomethyl ether and hexylene glycol is preferable because it allows a coating of excellent surface flatness to be formed.

The amount of water used in hydrolyzing the alkoxysilane compounds should preferably be in the range from 0.3 to 4 moles with respect to 1 mole of the alkoxysilane compounds.

The acid catalyst used in the hydrolytic reaction may be formic acid, maleic acid, acetic acid, hydrochloric acid, phosphoric acid, or nitric acid. Particularly preferable of these acid catalysts is nitric acid. The amount of the acid catalyst used should preferably be in the range from $1.3 \times 10^{-4}$ to $1.9 \times 10^{-4}$ moles with respect to 1 mole of the alkoxysilane compounds.

The coating solution according to the present invention is prepared by dissolving the mixture of alkoxysilane compounds into the organic solvent to produce a solution, and dropping water and the acid catalyst onto the solution for hydrolysis with a quaternary ammonium-salt compound. The quaternary ammonium-salt compound preferably comprises tetramethyl ammonium hydroxide, tetraethyl ammonium hydroxide, tetrapropyl ammonium hydroxide, trimethyl (2-hydroxyethyl) ammonium hydroxide, triethyl (2-hydroxyethyl) ammonium hydroxide, trimethyl (2-hydroxypropyl) ammonium hydroxide, triethyl (2 hydroxypropyl) ammoniumhydroxide, or the like. Preferable of these quaternary ammonium-salt compounds is tetramethyl ammonium hydroxide. The quaternary ammonium-salt compound is added in an amount ranging from 50 to 120 ppm with respect to the converted amount of $SiO_2$ in the coating solution. If the added amount of quaternary ammonium-salt compound exceeded 120 ppm, then the coating solution would not be retained stably on a surface to which it is applied. If the added amount of quaternary ammonium-salt compound were smaller than 50 ppm, then wrinkle-like surface irregularities would be developed on the coating surface.

A process of applying the above coating solution to form a silica coating will be described below.

FIG. 1 shows a rotary cup coating apparatus for use in applying the coating solution according to the present invention. As shown in FIG. 1, the rotary cup coating apparatus comprises an annular outer cup 1 and an inner cup 2 disposed in the annular outer cup 1. The inner cup 2 is mounted on the upper end of a vertical spinner shaft 3, which can be rotated about its own axis to rotate the inner cup 2 at a high speed within the annular outer cup 1. A vacuum chuck 4 for securely holding under suction a substrate W such as a semiconductor wafer or the like is disposed on the upper end of the spinner shaft 3 in the inner cup 2. The annular outer cup 1 has an annular collection passage 5 defined therein and extending around the inner cup 2, for receiving a drained solution discharged from the inner cup 2.

The outer and inner cups 1, 2 have respective upper openings which are selectively closed hermetically by respective lids 6, 7. A flow-rectifying plate 8 is mounted on a lower surface of the lid 7. When the lid 7 is closed, there is created a small gap between the flow-rectifying plate 8 and the upper surface of the substrate W fixedly supported on the vacuum chuck 4.

To apply a silica coating on the substrate W on the vacuum chuck 4, the rotary cup coating apparatus operates as follows: The lids 6, 7 are lifted to open the outer and inner cups 1, 2, and then the coating solution is dropped onto the upper surface of the substrate W fixedly supported on the vacuum chuck 4. Then, the lids 6, 7 are lowered to close the outer and inner cups 1, 2. The spinner shaft 3 is rotated about its own axis to rotate the vacuum chuck 4 and the inner cup 2 for spreading the coating solution over the upper surface of the substrate W under centrifugal forces.

The spinner shaft 3, and hence the substrate W supported on the vacuum chuck 4 and the inner cup 2, are rotated at a low speed in a first rotational mode and at a high speed in a second rotational mode a period of time after the first rotational mode is completed.

Specifically, the substrate W is rotated at a low speed in the first rotational mode for a first period of time less than 2 seconds. The period of time inserted between the first and second rotational modes is 10 to 20 times the first period of time for which the substrate W is rotated in the first rotational mode. Stated otherwise, after the first rotational mode, the substrate W is stopped for a period of time which is 10 to 20 times the first period of time. The substrate W is then rotated at a high speed in the second rotational mode for a second period of time which is 3 to 5 times the first period of time.

Figure 2A:
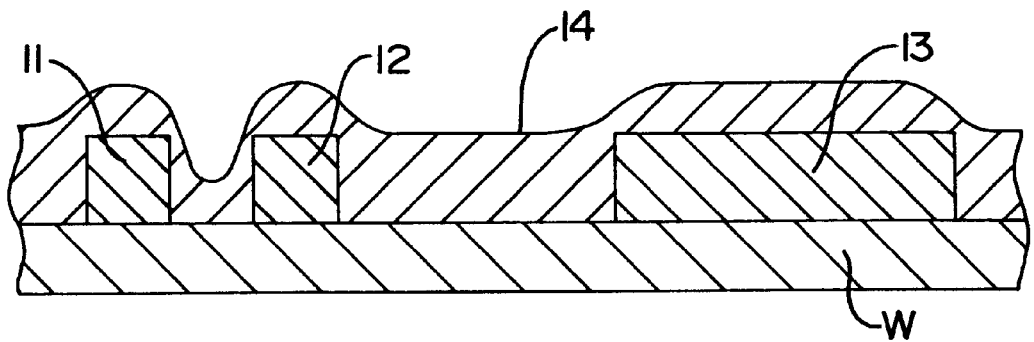
FIGS. 2(a), 2(b), and 2(c) are fragmentary cross-sectional views showing the thicknesses of a silica coating at respective different stages of a process of forming the silica coating according to the present invention.

At the end of the first rotational mode, as shown in FIG. 2(a), a coating solution 14 is coated to a thickness larger than a given thickness on twin patterns 11, 12 and a global pattern 13 on the substrate W, with the coating solution 14 being coated to a thickness smaller than the given thickness between the twin patterns 11, 12.

Figure 2B:
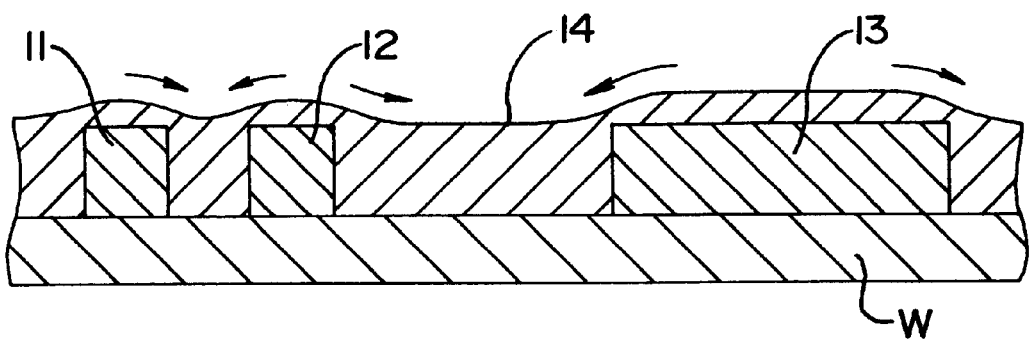
Figure 2C:
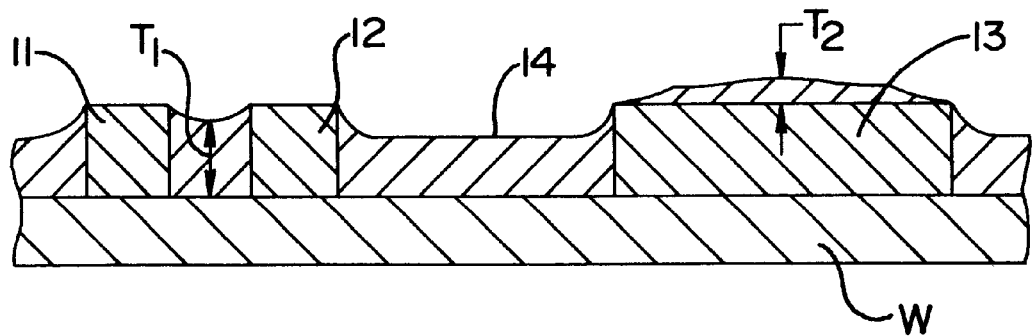

Subsequently, at the start of the second rotational mode, as shown in FIG. 2(b), the coating solution 14 coated on the twin patterns 11, 12 and the global pattern 13 flows into spaces between these patterns. At the end of the second rotational mode, as shown in FIG. 2(c), the thickness of the coating solution 14 on the twin patterns 11, 12 is almost nil, and the thickness of the coating solution 14 on the global pattern 13 is small in its entirety though it is somewhat large in the central area of the global pattern 13.

Therefore, according to the present invention, the thickness, designated by $T_1$, of the coating solution 14 between the twin patterns 11, 12, and the thickness, designated by $T_2$, of the coating solution 14 on the global pattern 13 are of substantially desired levels, respectively.

It is preferable to rotate the substrate w at a low speed in the first rotational mode and then rotate the substrate W successively at medium and high speeds in the second rotational mode, to insert a period of time which is 10 to 20 times the first period of time between the first and second rotational modes, and to rotate the substrate W in the second rotational mode for the second period of time which is 3 to 5 times the first period of time.

Inventive and Comparative Examples of the present invention will be described below. It should be noted that the present invention is not intended to be limited in any way by the detailed of Inventive and Comparative Examples.

Inventive Example 1

120 g (1 mole) of dimethyldimethoxysilane, 272 g (2 moles) of monomethyltrimethoxysilane, and 304 g (2 moles) of tetramethoxysilane were added to 600 g of propylene glycol monomethyl ether, and the mixture was stirred into a solution. To the solution, there was added 195 g of pure water with 0.7 g of 60 weight % of nitric acid dissolved therein. The mixture was stirred to allow the components to react with each other for 3 hours, and then left to stand for 3 days at 40° C. The resultant mixture was used as a crude coating solution. A portion of the crude coating solution was removed, and evaporated to produce a dried solid material, which had a concentration of 20 weight %. To the crude coating solution, there was added a mixture of 275 parts by weight of propylene glycol monomethyl ether and 110 parts by weight of hexylene glycol. The resulting solution was diluted such that the solid material contained therein would be of a concentration of 16 weight %. Thereafter, 100 ppm of tetramethyl ammonium hydroxide with respect to the converted amount of $SiO_2$ in the solution was added to the solution, thereby preparing a final coating solution.

The final coating solution was dropped onto a central area of the substrate W. Thereafter, the substrate W was rotated at a speed of 1000 rpm in the first rotational mode for 1 second, stopped for 10 seconds, and thereafter rotated successively at a speed of 3000 rpm for 3 seconds and then at a speed of 5000 rpm for 1 second in the second rotational mode.

Figure 3:
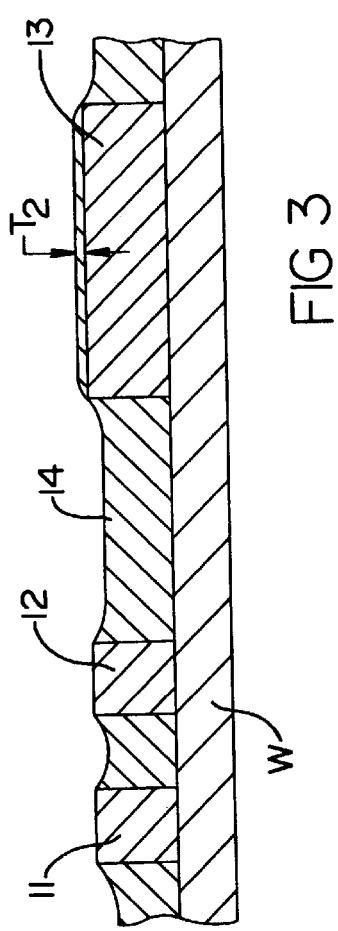
FIG. 3 is a fragmentary cross-sectional view showing the thickness of a silica coating which is formed under optimum conditions according to the present invention.

FIG. 3 shows in cross section the thickness of a coating thus formed on the substrate W according to Inventive Example 1 described above. As can be seen from FIG. 3, the coating solution 14 left on the global pattern 13 was in the form of a uniformly thin layer. Therefore, the produced coating had an excellent level of surface flatness and was completely free of wrinkle-like surface irregularities.

Inventive Example 2

The final coating solution prepared in Inventive Example 1 was dropped onto a central area of the substrate W. Thereafter, the substrate W was rotated at a low speed of 1000 rpm in the first rotational mode for 1 second, stopped for 10 seconds, and thereafter rotated at a speed of 3000 rpm for 3 seconds in the second rotational mode. As with Inventive Example 1, the produced coating had an excellent level of surface flatness and was completely free of wrinkle-like surface irregularities.

Comparative Example:

A coating solution was prepared in the same manner as with Inventive Example 1 except that tetramethyl ammonium hydroxide was not added, and applied to produce a coating on the substrate W in the same manner as with Inventive Example 1. The produced coating suffered a number of wrinkles on its surface.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A coating solution for forming a silica coating, comprising:
    a reaction product produced by hydrolyzing, in the presence of an acid catalyst, a mixture of at least two alkoxysilane compounds that are represented by the following general formulas:

$$R^1{}_2(OR^3)_2 \quad \text{(I)},$$

$$R^2Si(OR^4)_3 \quad \text{(II)},$$

and $$Si(OR^5)_4 \quad \text{(III)}$$

where $R^1$, $R^2$ each indicate a phenyl or alkyl group having a carbon number of 1 to 3, and $R^3$, $R^4$, $R^5$ each indicate an alkyl group having a carbon number of 1 to 3;
    an organic solvent; and
    a quaternary ammonium-salt compound.

2. A coating solution according to claim 1, wherein said mixture comprises three alkoxysilane compounds that are represented respectively by said general formulas (I), (II), and (III), and wherein said mixture contains the alkoxysilane compound represented by the general formula (I) in a proportion in the range from 0.5 to 2 moles and the alkoxysilane compound represented by the general formula (III) in a proportion in the range from 0.5 to 5 moles for every mole the alkoxysilane compound represented by the general formula (II).

3. A coating solution according to claim 1, wherein said quaternary ammonium-salt compound is added in an amount ranging from 50 to 120 ppm with respect to a converted amount of $SiO_2$ in the coating solution.

4. A method of forming a coating of the coating solution according to claim 1, on a planar workpiece with a rotary cup coating apparatus, comprising the steps of:
    dropping the coating solution onto the planar workpiece;
    rotating the planar workpiece at a first speed in a first rotational mode for a first period of time less than 2 seconds;
    stopping the planar workpiece for a period of time which is 10 to 20 times said first period of time after said first rotational mode; and
    thereafter, rotating the planar workpiece at a second speed higher than said first speed in a second rotational mode for a second period of time which is 3 to 5 times said first period of time.

5. A method of forming a coating on a planar workpiece according to claim 4, wherein said second rotational mode involves rotating the planar workpiece successively at a second speed higher than said first speed and a third speed higher than said second speed for a period of time which is 3 to 5 times said first period of time.

6. A method of forming a coating of the coating solution according to claim 2 on a planar workpiece with a rotary cup coating apparatus, comprising the steps of:
    dropping the coating solution onto the planar workpiece;
    rotating the planar workpiece at a first speed in a first rotational mode for a first period of time less than 2 seconds;
    stopping the planar workpiece for a period of time which is 10 to 20 times said first period of time after said first rotational mode; and
    thereafter, rotating the planar workpiece at a second speed higher than said first speed in a second rotational mode for a second period of time which is 3 to 5 times said first period of time.

7. A method of forming a coating of the coating solution according to claim 3 on a planar workpiece with a rotary cup coating apparatus, comprising the steps of:
    dropping the coating solution onto the planar workpiece;
    rotating the planar workpiece at a first speed in a first rotational mode for a first period of time less than 2 seconds;
    stopping the planar workpiece for a period of time which is 10 to 20 times said first period of time after said first rotational mode; and
    thereafter, rotating the planar workpiece at a second speed higher than said first speed in a second rotational mode for a second period of time which is 3 to 5 times said first period of time.

8. A method of forming a coating on a planar workpiece according to claim 6, wherein said second rotational mode involves rotating the planar workpiece successively said second speed higher than said first speed and at a third speed higher than said second speed for said second period of time.

9. A method of forming a coating on a planar workpiece according to claim 7, wherein said second rotational mode involves rotating the planar workpiece successively at said second speed higher than said first speed and at a third speed higher than said second speed for said second period of time.

10. A method of forming a coating on a planar workpiece according to claim 4, wherein said planar workpiece has irregularities on a surface thereof.

11. A method of forming a coating on a planar workpiece according to claim 6, wherein said planar workpiece has irregularities on a surface thereof.

12. A method of forming a coating on a planar workpiece according to claim 7, wherein said planar workpiece has irregularities on a surface thereof.

13. A coating solution according to claim 1, wherein an amount of water used in hydrolyzing the alkoxysilane compounds is in a range from 0.3 to 4 moles for each mole of the alkoxysilane compounds.

14. A coating solution according to claim 1, wherein an amount of acid catalyst used in hydrolyzing said alkoxysilane compounds is in a range of from $13\times10^{-3}$ to $1.9\times10^{-4}$ moles for each mole of the alkoxysilane compounds.

15. A coating solution according to claim 1, wherein said mixture comprises two alkoxysilane compounds that are represented respectively by said general formulas (I) and (III), and wherein said mixtures contains the alkoxysilane compound represented by the general formula (I) in a proportion in the range from 0.2–2 moles for every mole of the alkoxysilane compound represented by the general formula (III).

16. A coating solution according to claim 1, wherein said mixture comprises two alkoxysilane compounds that are represented respectively by said general formulas (II) and (III), and wherein said mixture contains the alkoxysilane compound represented by the general formula (II) in a proportion in a range of 0.2–2 moles for every mole of the alkoxysilane compound represented by the general formula (III).

17. A coating solution according to claim 1, wherein said mixture comprises two alkoxysilane compounds that are represented respectively by said general formulas (I) and (II), and wherein said mixture contains the alkoxysilane compound represented by the general formula (I) in a proportion in the range from 0.2–2 moles for every 0.2–2 moles of the alkoxysilane compound represented by the general formula (II).

18. A coating solution according to claim 2, wherein said mixture comprises 0.1–1.8 moles of dimethyldimethoxysilane and 0.5–3 moles of tetramethoxysilane for every mole of monomethyltrimethoxysilane.

19. A coating solution according to claim 1, wherein said organic solvent comprises at least one of propylene glycol monomethyl ether, propylene glycol monopropyl ether, propylene glycol and hexylene glycol.

20. The coating solution according to claim 1, wherein said quaternary ammonium-salt compound comprises tetramethyl ammonium hydroxide.

* * * * *

UNITED STATES PATENT AND TRADEMARK OFFICE
CERTIFICATE OF CORRECTION

PATENT NO. : 6,214,104 B1
DATED : April 10, 2001
INVENTOR(S) : H. Iida, H. Endo, H. Kobari, Y. Hagiwara, T. Nakayama It is certified that error appears in the above-identified patent and that said Letters Patent is hereby corrected as shown below:

Column 3,
Line 61, change "general i" to -- general --.

Column 4,
Line 62, change "ammoniumhydroxide" to -- ammonium hydroxide --.

Column 6,
Line 9, change "substrate w" to -- substrate W --;
Line 20, after "detailed" insert -- description --.

Column 7,
Line 26 (claim 1, 7th line), change "$R^1_2(OR^3)_2$" to -- $R^1_2Si(OR^3)_2$ --;
Line 52 (claim 4, 2nd line), after "1" delete the comma.

Column 8,
Line 35 (claim 8, 3rd line), after "successively" insert -- at --;
Line 58 (claim 14, 3rd line), change "$13 \times 10^{-3}$" to -- $1.3 \times 10^{-4}$ --;
Line 63 (claim 15, 4th line), change "mixtures" to -- mixture --.

Signed and Sealed this

Sixth Day of November, 2001

*Attest:*

NICHOLAS P. GODICI
*Attesting Officer*     *Acting Director of the United States Patent and Trademark Office*